(12) United States Patent
Ichinose et al.

(10) Patent No.: US 9,174,549 B2
(45) Date of Patent: Nov. 3, 2015

(54) DRIVING FORCE CONTROL DEVICE FOR ELECTRIC VEHICLE

(75) Inventors: Masanori Ichinose, Tsukuba (JP);
Tomohiko Yasuda, Kashiwa (JP);
Takayuki Satou, Kashiwa (JP)

(73) Assignee: HITACHI CONSTRUCTION MACHINERY CO., LTD., Tokyo (JP)

(*) Notice: Subject to any disclaimer, the term of this patent is extended or adjusted under 35 U.S.C. 154(b) by 120 days.

(21) Appl. No.: 13/806,808

(22) PCT Filed: Jun. 22, 2011

(86) PCT No.: PCT/JP2011/064318
§ 371 (c)(1),
(2), (4) Date: Dec. 24, 2012

(87) PCT Pub. No.: WO2012/002234
PCT Pub. Date: Jan. 5, 2012

(65) Prior Publication Data
US 2013/0103244 A1    Apr. 25, 2013

(30) Foreign Application Priority Data

Jun. 30, 2010  (JP) .................................. 2010-149725

(51) Int. Cl.
*B60L 3/06*      (2006.01)
*B60K 17/356*    (2006.01)
(Continued)

(52) U.S. Cl.
CPC ............... *B60L 15/20* (2013.01); *B60K 17/356* (2013.01);
(Continued)

(58) Field of Classification Search
CPC ..... B60L 3/06; B60L 15/2036; B60L 11/123; B60L 3/0023; B60L 11/1803; B60L 3/102; B60L 15/025; B60K 17/356; B60K 23/0808; B60K 6/46; B60K 6/445; B60K 6/48; B60K 6/442; B60T 8/1755; B60T 13/741; B60T 13/745; B60T 8/3655; B60T 8/4081; B60W 10/04; B60W 10/08; G01R 31/3651; G01R 35/005

USPC ......... 701/22, 70; 180/65.1; 290/4 R; 303/20, 303/146, 15, 113.5; 318/432, 139, 802; 187/290; 477/3
See application file for complete search history.

(56) References Cited

U.S. PATENT DOCUMENTS 5,796,224 A * 8/1998 Hayashi et al. ............... 318/139
6,274,998 B1 * 8/2001 Kaneko et al. ................ 318/802
(Continued)

FOREIGN PATENT DOCUMENTS

JP    2004-120821    4/2004
JP    2005-73458     3/2005
(Continued)

*Primary Examiner* — Tuan C. To
*Assistant Examiner* — Yuri Kan
(74) *Attorney, Agent, or Firm* — Baker Botts L.L.P.

(57) ABSTRACT

Disclosed is a driving force control device that includes a determination section (12), a driving force command value calculation section (13), and a command value output section (14). The determination section (12) determines whether each of a plurality of motors (106), which independently drive a plurality of wheels (107), can be operated within a desired operating range when driven by a target driving force calculated for each of the motors (106). The driving force command value calculation section (13) adjusts the distribution of driving force for each of the motors in accordance with the target driving force for each of the motors and with the operating status of each of the motors and calculates an actual driving force command value for each of the motors for the purpose of operating each of the motors within the desired operating range if the determination means determines that each of the motors cannot be operated within the desired operating range. The command value output section (14) outputs the driving force command value to each of a plurality of inverters (105). Therefore, a target vehicle motion can be maximally realized while appropriately maintaining the drive status of each of the motors.

4 Claims, 9 Drawing Sheets

(51) Int. Cl.
*B60L 15/20* (2006.01)
*B60L 15/10* (2006.01)
*B60W 10/08* (2006.01)
*B60W 30/18* (2012.01)
*B60K 7/00* (2006.01)

(52) U.S. Cl.
CPC . *B60L 3/06* (2013.01); *B60L 15/10* (2013.01); *B60L 15/2036* (2013.01); *B60W 10/08* (2013.01); *B60W 30/18172* (2013.01); *B60K 7/0007* (2013.01); *B60L 2200/26* (2013.01); *B60L 2220/46* (2013.01); *B60W 2710/083* (2013.01); *B60W 2710/105* (2013.01); *B60W 2720/30* (2013.01); *B60Y 2200/142* (2013.01); *B60Y 2200/20* (2013.01); *Y02T 10/646* (2013.01); *Y02T 10/648* (2013.01); *Y02T 10/7275* (2013.01)

(56) References Cited

U.S. PATENT DOCUMENTS

| | | | |
|---|---|---|---|
| 6,749,269 B1* | 6/2004 | Niwa | 303/20 |
| 7,164,247 B2* | 1/2007 | Joe et al. | 318/432 |
| 2002/0062184 A1* | 5/2002 | Yoshino et al. | 701/22 |
| 2005/0252701 A1* | 11/2005 | Shimizu | 180/65.1 |
| 2007/0158948 A1* | 7/2007 | Oyobe et al. | 290/4 R |
| 2007/0173372 A1* | 7/2007 | Ueno | 477/3 |
| 2008/0221766 A1* | 9/2008 | Maeda et al. | 701/70 |
| 2009/0026835 A1* | 1/2009 | Matsubara et al. | 303/15 |
| 2009/0108671 A1* | 4/2009 | Maeda et al. | 303/146 |
| 2009/0315391 A1* | 12/2009 | Tanaka et al. | 303/113.5 |
| 2011/0226559 A1* | 9/2011 | Chen et al. | 187/290 |

FOREIGN PATENT DOCUMENTS

| | | |
|---|---|---|
| JP | 2005-204436 | 7/2005 |
| JP | 2007-210586 | 8/2007 |
| JP | 2008-48528 | 2/2008 |
| JP | 2008-143382 | 6/2008 |

\* cited by examiner

DRIVING FORCE CONTROL DEVICE FOR ELECTRIC VEHICLE

TECHNICAL FIELD

The present invention relates to a driving force control device that is mounted in an electric vehicle having a plurality of electric motors for independently driving a plurality of wheels and used to control the driving force of each of the electric motors in accordance with an operation performed by an operator of the vehicle or with the running status of the vehicle.

BACKGROUND ART

As vehicles that run by using electrically-driven motors as a motive power source, for example, hybrid automobiles and electric automobiles are widely used in recent years in addition to railroad vehicles. Further, mining dump trucks and other large-size construction machines are also electrified. A formerly known electric vehicle uses a power split device (differential) and drives a plurality of wheels with one motor. However, a presently known electric vehicle is equipped with a plurality of motors for independently driving individual wheels in order, for instance, to control the motion of the vehicle by regulating the driving torque of each wheel on an individual basis. A relevant technology disclosed, for instance, in JP-A-2005-73458 relates to an electric vehicle having motors capable of distributing a driving force to front and rear, left- and right-side wheels. When a target driving force (requested driving force) in the front-rear direction and a target driving force (requested driving force) in the left-right direction cannot be simultaneously provided within a range of torque that can be output by left- and right-side motors, this technology gives higher priority to the target driving force in the front-rear direction than to the target driving force in the left-right direction in order to improve the traction performance of the vehicle.

PRIOR ART LITERATURE

Patent Document

Patent Document 1: JP-2005-73458-A

SUMMARY OF THE INVENTION

Problems to be Solved by the Invention

Even when the drive of each motor is controlled within the range of torque that can be output by each motor as described in connection with the above technology, the above technology may fail to achieve a target vehicle motion or decrease operating efficiency depending on the drive status of each motor (e.g., motor revolution speed, output torque, and applied voltage). For example, even if the drive of each motor is controlled within the range of torque that can be output by each motor, a motor for power running and a motor for regeneration may coexist depending on an acceleration request, a turning request, or other request for the vehicle. If a starting voltage required for power running greatly differs from a regenerative voltage generated during regeneration in a situation where the motors for power running and regeneration coexist as described above, motor efficiency may significantly decrease to result in the failure to generate torque required for vehicle motion control when regenerative power is used to drive a different motor or a battery may not easily recover electrical power from the motor for regeneration.

An object of the present invention is to provide an electric vehicle that can maximally realize a target vehicle motion while appropriately maintaining the drive status of each motor.

Means for Solving the Problems

In accomplishing the above object, according to an aspect of the present invention, there is provided a driving force control device for an electric vehicle having a plurality of motors, which independently drive a plurality of wheels, and a plurality of inverters, which control a drive current for each of the motors in accordance with a driving force command value. The driving force control device includes target driving force calculation means, determination means, driving force command value calculation means, and command value output means. The target driving force calculation means calculates a target driving force for each of the motors in accordance with a vehicle operation performed by an operator of the vehicle or with the running status of the vehicle. The determination means determines whether each of the motors can be operated within a desired operating range when each of the motors is driven by the target driving force. If the determination means determines that each of the motors cannot be operated within the desired operating range, the driving force command value calculation means adjusts the distribution of driving force for each of the motors in accordance with the target driving force for each of the motors and with the operating status of each of the motors and calculates an actual driving force command value for each of the motors for the purpose of operating each of the motors within the desired operating range. The command value output means outputs the driving force command value to each of the inverters.

Effects of the Invention

The present invention makes it possible to maximally realize a target vehicle motion while appropriately maintaining the drive status of each motor.

MODE FOR CARRYING OUT THE INVENTION

Embodiments of the present invention will now be described with reference to the accompanying drawings.

Figure 1:
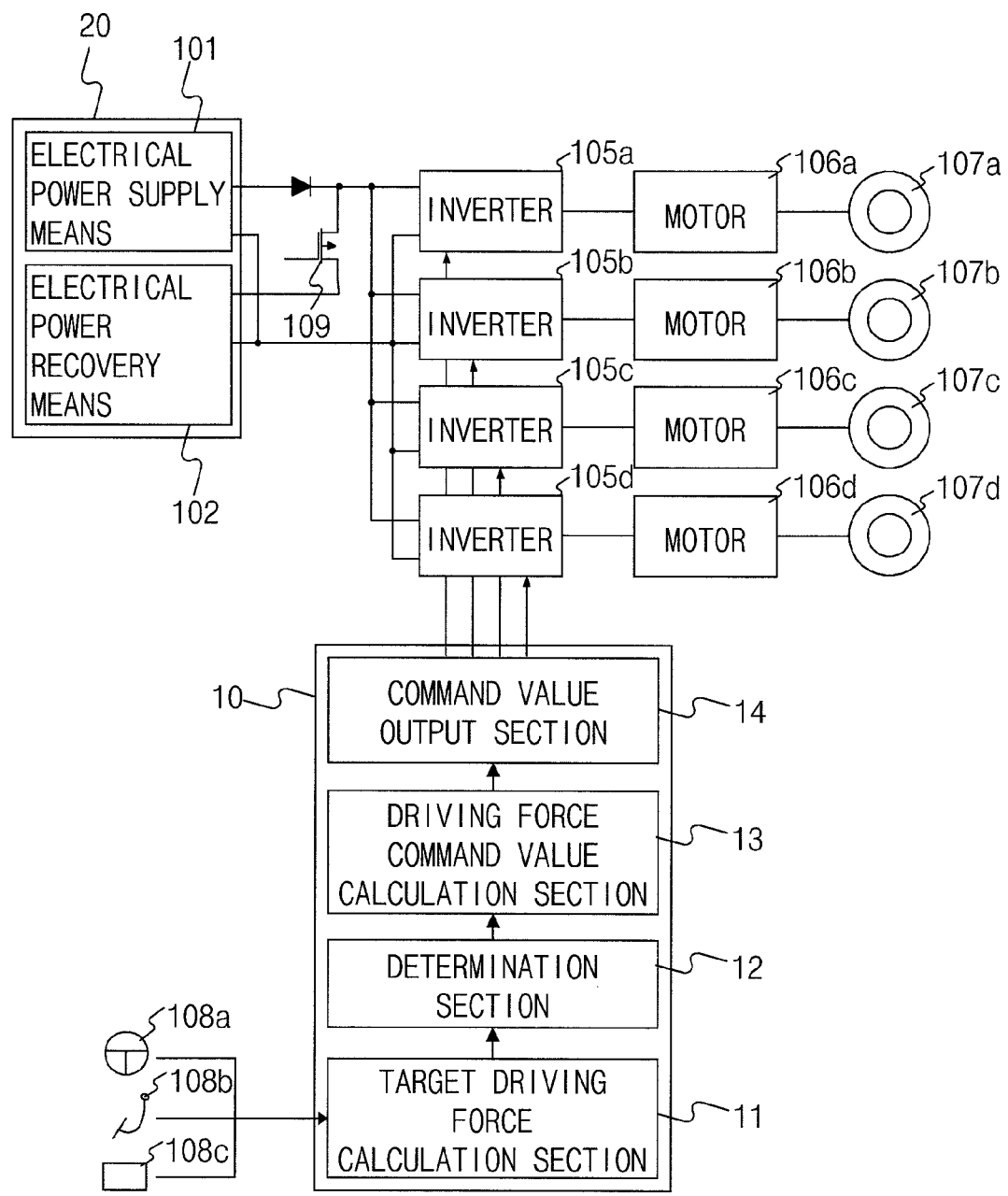
FIG. 1 is a diagram illustrating the overall configuration of an electric vehicle according to a first embodiment of the present invention.

FIG. 1 is a diagram illustrating the overall configuration of an electric vehicle according to a first embodiment of the present invention. The electric vehicle shown in FIG. 1 includes a plurality of wheels 107a to 107d, a plurality of motors 106a to 106d, a plurality of inverters 105a to 105d, a battery 20, a chopper 109, and a driving force control device 10.

The wheel 107a and the wheel 107b are mounted on the left or right side of a vehicle body as front wheels. The wheel 107c and the wheel 107d are mounted on the left or right side of the vehicle body as rear wheels. The motors 106a to 106d are connected to the associated wheels 107a to 107d so as to independently drive the wheels 107a to 107d. The inverters 105a to 105d are respectively connected to the motors 106a to 106d to control a drive current for each of the motors 106a to 106d in accordance with a driving force command value, which is determined for each of the motors 106a to 106d by the driving force control device 10. The battery 20 is connected to a power supply line to function as electrical power supply means 101 and as electrical power recovery means 102. The electrical power supply means 101 supplies driving electrical power to the motors 106a to 106d. The electrical power recovery means 102 recovers regenerative power that is generated when deceleration is performed by the motors 106a to 106d. The inverters 105a to 105d are connected to the power supply line and further connected to the motors 106a to 106d via the power supply line. The chopper 109 controls the regenerative power that is recovered from the motors 106 to the battery 20.

The driving force control device 10 includes a target driving force calculation section 11, a determination section 12, a driving force command value calculation section 13, and a command value output section 14.

The target driving force calculation section (target driving force calculation means) 11 calculates a target driving force for each of the motors 106a to 106d in accordance with a vehicle operation performed by an operator of the vehicle or with the running status of the vehicle. The target driving force calculation section 11 is connected to various sensors such as a steering angle sensor 108a for detecting a steering angle that is formed when the operator performs a steering operation, an acceleration sensor 108b for detecting an amount by which an accelerator pedal is depressed by the operator, and a yaw rate sensor 108c for detecting an actual yaw rate of the vehicle during a turning operation. The target driving force calculation section 11 may also be connected to a speed sensor (not shown) for detecting the revolution speed of each motor in order to detect a vehicle speed.

The target driving force calculation section 11 estimates the vehicle running status in accordance with values detected by the aforementioned sensors, and calculates the target driving force in accordance with the estimated vehicle running status. The estimated vehicle running status includes, for example, the vehicle speed, acceleration, information indicating whether the vehicle is turning, and information indicating whether the vehicle is skidding. The calculated target driving force is torque that is required for each of the motors 106a to 106d to let the vehicle run steadily. The target driving force calculated by the target driving force calculation section 11 is output to the determination section 12.

The determination section (determination means) 12 determines whether each of the motors 106a to 106d can be operated within a desired operating range when each of the motors 106a to 106d is driven by the target driving force calculated by the target driving force calculation section 11. Operating characteristics of the motors 106a to 106d are such that output torque generally decreases in inverse proportion to the revolution speed due to the influence of a motor's counter-electromotive force. Further, higher torque is usually required for regenerative braking than for power running. Therefore, power running and regeneration may differ in motor terminal power supply voltage due, for instance, to electrical current limitations on an inverter device or winding or to torque characteristics curve shape changes caused by voltage. These factors may impose limitations on motor output torque or cause power supply voltage changes. As such being the case, the present embodiment uses the determination section 12 to determine whether the motors 106a to 106d are operated within a range that is not affected by the above-mentioned limitations. More specifically, the determination section 12 according to the present embodiment determines whether the motors 106a to 106d for power running and for regeneration coexist when they are driven by the target driving force calculated by the target driving force calculation section 11.

The command value output section (command value output means) 14 outputs the driving force command value, which is calculated by the later-described driving force command value calculation section 13, to each of the inverters 105a to 105d, and is connected to the inverters 105a to 105d.

The driving force command value calculation section (driving force command value calculation means) 13 calculates the driving force command value for each of the motors 106a to 106d in accordance with the target driving force for each of the motors 106a to 106d, which is calculated by the target driving force calculation section 11. If the determination section 12 determines that each of the motors 106a to 106d can be operated within the desired operating range, the driving force command value calculation section 13 calculates the driving force command value for each of the motors 106a to 106d in accordance with the target driving force calculated by the target driving force calculation section 11. If, on the other hand, the determination section 12 determines that each of the motors 106a to 106d cannot be operated within the desired operating range, the driving force command value calculation section 13 adjusts the distribution of driving force for each of the motors 106a to 106d in accordance with the target driving force for each of the motors and with the operating status of each of the motors and calculates an actual driving force command value for each of the motors for the purpose of operating each of the motors 106a to 106d within the desired operating range. The calculated driving force command value is a torque value for each of the motors 106a to 106d and proportional to an electrical current value to be supplied to each of the motors 106a to 106d. It is assumed that the driving force command value indicates power running when it has a positive sign and indicates regeneration when it has a negative sign.

When the determination section 12 determines that each of the motors 106a to 106d cannot be operated within the desired operating range, the driving force command value calculation section 13 adjusts the driving force distribution for driving force command value calculation. When the determination section 12 determines that the motors 106a to 106d for power running and for regeneration coexist, a preferred driving force distribution adjustment method is to adjust the driving force distribution for each of the motors 106a to 106d in accordance with the target driving force for each of the motors 106a to 106d so that all the operations performed by the motors 106a to 106d are for either power running or regeneration (namely, the calculated driving force command values have the same sign), and calculate the actual driving force command value for each of the motors 106a to 106d. When the adjustment is made as described above so that all the operations performed by the motors 106a to 106d are for either power running or regeneration, a drive voltage required for motor power running does not greatly differ from a regenerative voltage generated during motor regeneration. This makes it possible to avoid a situation where motor efficiency significantly decreases to result in the failure to generate required torque and provide vehicle motion control based on a desired torque difference. In other words, a power running state and a regeneration state can be clearly differentiated from each other to provide reliable vehicle motion control irrespective of motor characteristics and motor operating status.

A further preferred driving force distribution adjustment method to be used by the driving force command value calculation section 13 when the determination section 12 determines that the motors 106a to 106d operated for power running and for regeneration coexist is to adjust the driving force distribution for each of the motors 106a to 106d in accordance with the target driving force for each of the motors 106a to 106d so that all the operations performed by the motors 106a to 106d are for either power running or regeneration, and calculate the actual driving force command value for each of the motors 106a to 106d. This adjustment method will be described below with reference to FIG. 2.

Figure 2:
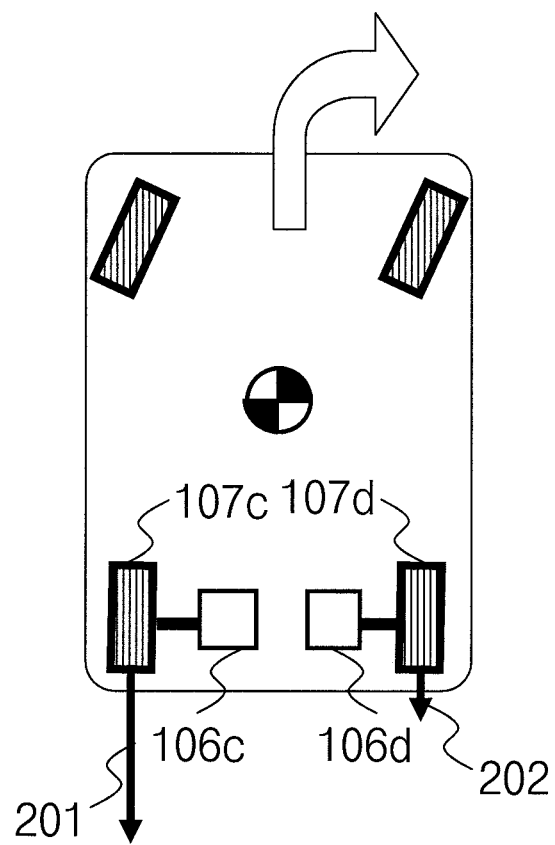
FIG. 2 is a diagram illustrating the running status of the electric vehicle according to the first embodiment of the present invention.

FIG. 2 is a diagram illustrating the running status of the electric vehicle according to the first embodiment of the present invention. Like elements in FIGS. 1 and 2 are designated by the same reference numerals and will not be redundantly described (this is also true for the subsequent drawings). For the sake of convenience, attention will now be focused on the rear wheels 107c, 107d, which are mounted on the left and right sides of the vehicle body. If, for instance, the vehicle body spins due to oversteer when a braked right-turning operation is performed as shown in FIG. 2, the target driving force calculation section 11 increases a deceleration torque on the left-side wheel 107c (arrow 201 in the drawing) and decreases a deceleration torque on the right-side wheel 107d (arrow 202 in the drawing) by the same amount as for the left-side wheel 107c. This generates a counterclockwise yaw moment around the center of gravity of the vehicle body in order to correct the attitude of the vehicle body that has spun. However, if a requested yaw moment amount for correcting the vehicle body attitude exceeds a braking command, the target driving force 202 for the right-side wheel 107d further decreases so that a transition is made toward power running (toward a direction opposite the direction indicated by the arrow). As a result, power running and regeneration simultaneously occur. In this instance, therefore, the driving force command value calculation section 13 allocates the driving force 202 shifted toward power running as the driving force 201 for regeneration for the purpose of avoiding a spin without changing the amount of yaw moment generation. A process performed by the driving force control device 10 in the above instance will now be described in detail with reference to FIG. 3.

Figure 3:
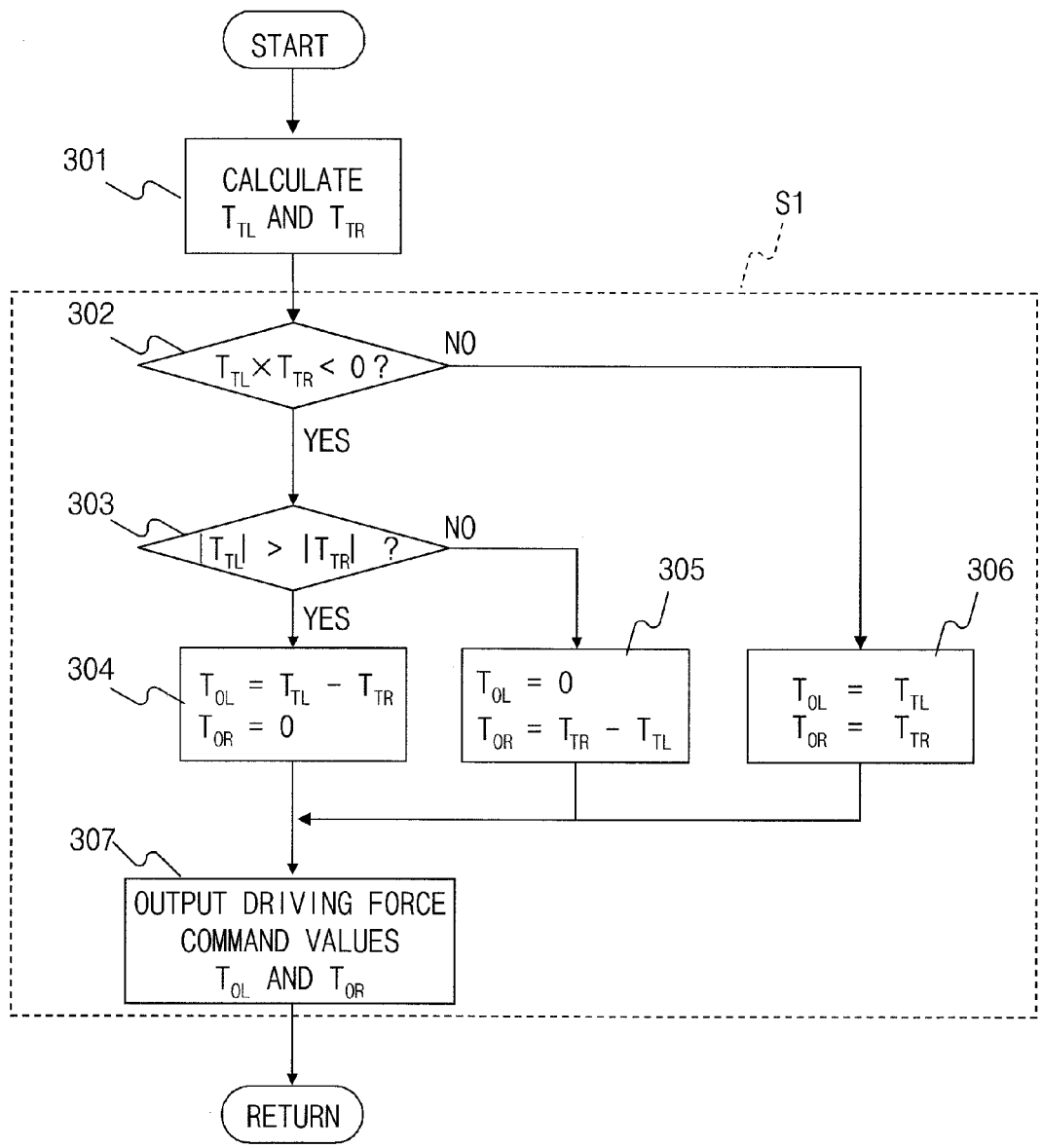
FIG. 3 is a flowchart illustrating processing steps performed by a driving force control device 10 of the electric vehicle according to the first embodiment of the present invention.

FIG. 3 is a flowchart illustrating processing steps performed by the driving force control device 10 of the electric vehicle according to the first embodiment of the present invention. At the beginning of the process shown in FIG. 3, the driving force control device 10 uses the target driving force calculation section 11 to calculate the target driving forces $T_{TL}$, $T_{TR}$ for the left- and right-side wheels 107c, 107d, and outputs the target driving forces $T_{TL}$, $T_{TR}$ to the determination section 12 (step 301). Next, the driving force control device 10 uses the determination section 12 to determine in accordance with the signs of the target driving forces $T_{TL}$, $T_{TR}$ whether one of the motors 106c, 106d is engaged in power running while the other is engaged in regeneration, and outputs the result of determination to the driving force command value calculation section 13 (step 302). More specifically, the determination section 12 according to the present embodiment determines requested operations of the two motors 106c, 106d in accordance with the sign of a value obtained by multiplying the two target driving forces $T_{TL}$, $T_{TR}$. If the sign is "positive", the determination section 12 determines that both the operations of the two motors are for either power running or regeneration. If, on the other hand, the sign is "negative", the determination section 12 determines that a motor engaged in power running and a motor engaged in regeneration coexist.

If the determination result obtained in step 302 indicates that a motor engaged in power running and a motor engaged in regeneration coexist, the driving force command value calculation section 13 of the driving force control device 10 compares the absolute values of the target driving forces $T_{TL}$, $T_{TR}$ for the two motors 106c, 106d to determine which of the two motors has the smaller absolute value (step 303). Next, the sign of the target driving force for the motor having the smaller absolute value, which was determined in step 303, is inverted and then added to the target driving force for the other motor (the motor having the greater absolute value) to calculate the driving force command value for the other motor. Further, the driving force command value for the motor having the smaller absolute value is calculated while the target driving force for the motor having the smaller absolute value is regarded as zero. Step 304 is performed when the determination result obtained in step 303 indicates that the target driving force $T_{TR}$ for the motor 106d has the smaller absolute value. In step 304, the sign of the target driving force $T_{TR}$ is inverted and then added to the target driving force $T_{TL}$ for the motor 106c to calculate a driving force command value $T_{OL}$ for the motor 106c, and a driving force command value $T_{OR}$ is calculated while the target driving force $T_{TR}$ for the motor 106d is regarded as zero. Meanwhile, step 305 is performed when the determination result obtained in step 303 indicates that the target driving force $T_{TL}$ for the motor 106c has the smaller absolute value. In step 305, the sign of the target driving force $T_{TL}$ is inverted and then added to the target driving force $T_{TR}$ for the motor 106d to calculate the driving force command value $T_{OR}$ for the motor 106d, and the driving force command value $T_{OL}$ is calculated while the target driving force $T_{TL}$ for the motor 106c is regarded as zero.

If, on the other hand, the determination result obtained in step 302 does not indicate that a motor engaged in power running and a motor engaged in regeneration coexist, the driving force command values $T_{OL}$, $T_{OR}$ are directly calculated in accordance with the target driving forces $T_{TL}$, $T_{TR}$ calculated by the target driving force calculation section 11 (step 306). Next, the driving force control device 10 uses the command value output section 14 to output the driving force command values $T_{OL}$, $T_{OR}$, which were calculated in step 304, 305, or 306, to the inverters 105c, 105d (step 307). The inverters 105c, 105d then control the driving torque of each of the motors 106c, 106d to rotate the wheels 107c, 107d, thereby causing the vehicle to run. Upon completion of step 307, processing returns to step 301 so that the above-described processing steps are repeated. A process performed in steps 302 to 307, which are enclosed by the broken line in FIG. 3, may be hereinafter referred to as S1.

Figure 4:
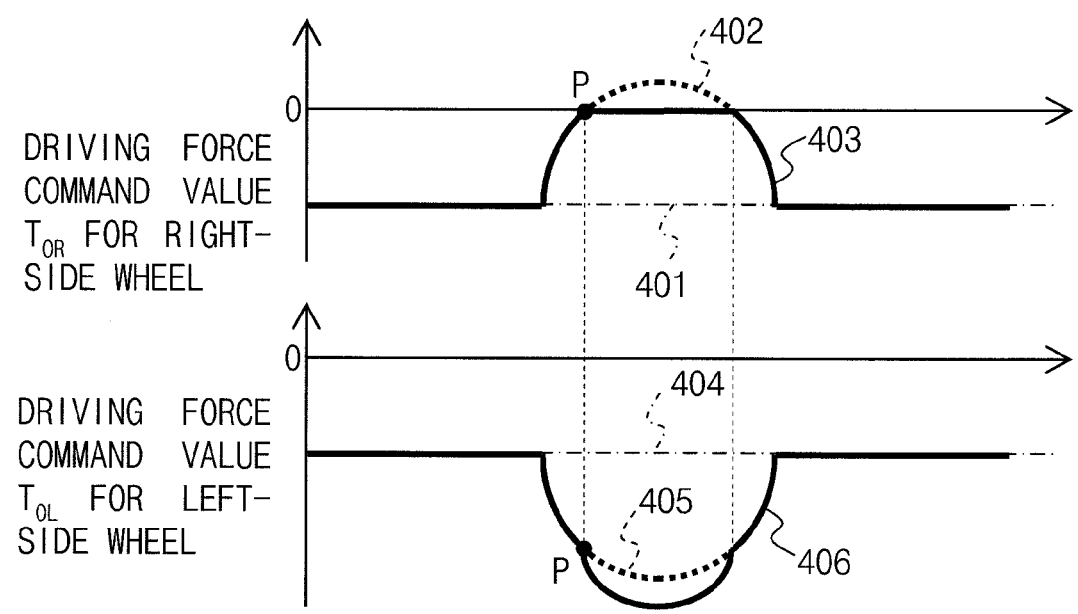
FIG. 4 is a diagram illustrating driving force command values that are issued to motors 106c, 106d when a sinusoidal requested yaw moment amount is generated during a braked right-turning operation.

As a concrete example of the above process, a situation where a sinusoidal requested yaw moment amount is generated to correct the attitude of the vehicle body that has spun as shown in FIG. 2 during a braked right-turning operation will now be described. FIG. 4 is a diagram illustrating the driving force command values $T_{OL}$, $T_{OR}$ that are issued to the motors 106c, 106d when a requested amount of sinusoidal yaw moment is generated during a braked right-turning operation.

In FIG. 4, one-dot chain lines 401, 404 each represent a braking request generated when a brake pedal is depressed by the operator, that is, a negative driving force. Waveforms 402, 405 indicated by broken lines represent the target driving forces $T_{TL}$, $T_{TR}$ that are calculated by the target driving force calculation section 11 to correct the spin. Waveforms 403, 406 indicated by solid lines represent the driving force command values $T_{OL}$, $T_{OR}$ calculated by the driving force command value calculation section 13.

In the example shown in FIG. 4, a yaw moment is generated for spin correction purposes by applying a correction value to the left-side wheel 107c toward a relatively strong braking side as compared to the right-side wheel 107d and applying a correction value to the right-side wheel 107d toward a relatively weak braking side. At the beginning of spin correction, the motors 106c, 106d are both engaged in regeneration. Therefore, steps 301, 302, 306, and 307 of the above process are repeatedly performed in the driving force control device 10. However, if the target driving force TTR for the right-side wheel 107d changes from a negative value to a positive value during an increase in the requested yaw moment amount (point P in FIG. 4), the determination section 12 determines that a motor engaged in power running and a motor engaged in regeneration coexist, and performs steps 303 and beyond. More specifically, if the determination section 12 determines that a motor engaged in power running and a motor engaged in regeneration coexist, the driving force command value calculation section 13 changes the target driving force TTR for the right-side wheel 107d to zero by adding the target driving force TTR for the right-side wheel 107d, which has a relatively small absolute value, to the target driving force TTL for the left-side wheel 107c. The driving force command values ToL, ToR calculated in the above-described manner are represented by the waveforms 403, 406 indicated by the solid lines. In this instance, the difference between the driving force command values ToL, ToR for the left- and right-side wheels 107c, 107d remains unchanged even after the target driving force TTR for the right-side wheel 107d is added to the target driving force TTL for the left-side wheel 107c. Therefore, the requested amount of yaw moment can be generated.

If power running and regeneration are both involved in the target driving forces for the left- and right-side motors 106c, 106d as described in connection with the present embodiment, the driving force can be redistributed while maintaining the driving force difference without simultaneously involving power running and regeneration when the driving force for one motor whose target driving force has a small absolute value is changed to zero for that motor and reallocated to the other motor. Therefore, when the power running state and the regeneration state are clearly differentiated from each other, the present embodiment makes it possible to surely generate an appropriate amount of yaw moment, which is based on the torque difference between the left- and right-side wheels 107c, 107d, without regard to motor characteristics and motor operating status. As a result, a target vehicle motion can be maximally realized while appropriately maintaining the drive status of each motor.

The above description is given in relation to a case where a spin encountered during a decelerated run (braked run) is corrected. However, the same effect can be produced even when a spin is encountered during an accelerated run. In this instance, the target driving force for one motor gradually changes from the power running side to zero in accordance with an increase in the requested yaw moment amount. When the sign of the target driving force for the one motor changes to negative, the sign of the target driving force can be inverted to add the resulting target driving force to the other target driving force in such a manner that the target driving force for the one motor is changed to zero.

The above description is given in relation to a case where the motors 106 drive a pair of left- and right-side wheels. However, even when the motors 106 drive two or more pairs of left- and right-side wheels, the same effect can be produced by the present embodiment as far as the above-described process is performed in such a manner that the motors for each pair perform either a power running operation or a regeneration operation, and that all the motors connected to the same battery (electrical power supply means and electrical power recovery means) 20 perform either the power running operation or the regeneration operation.

Figure 5:
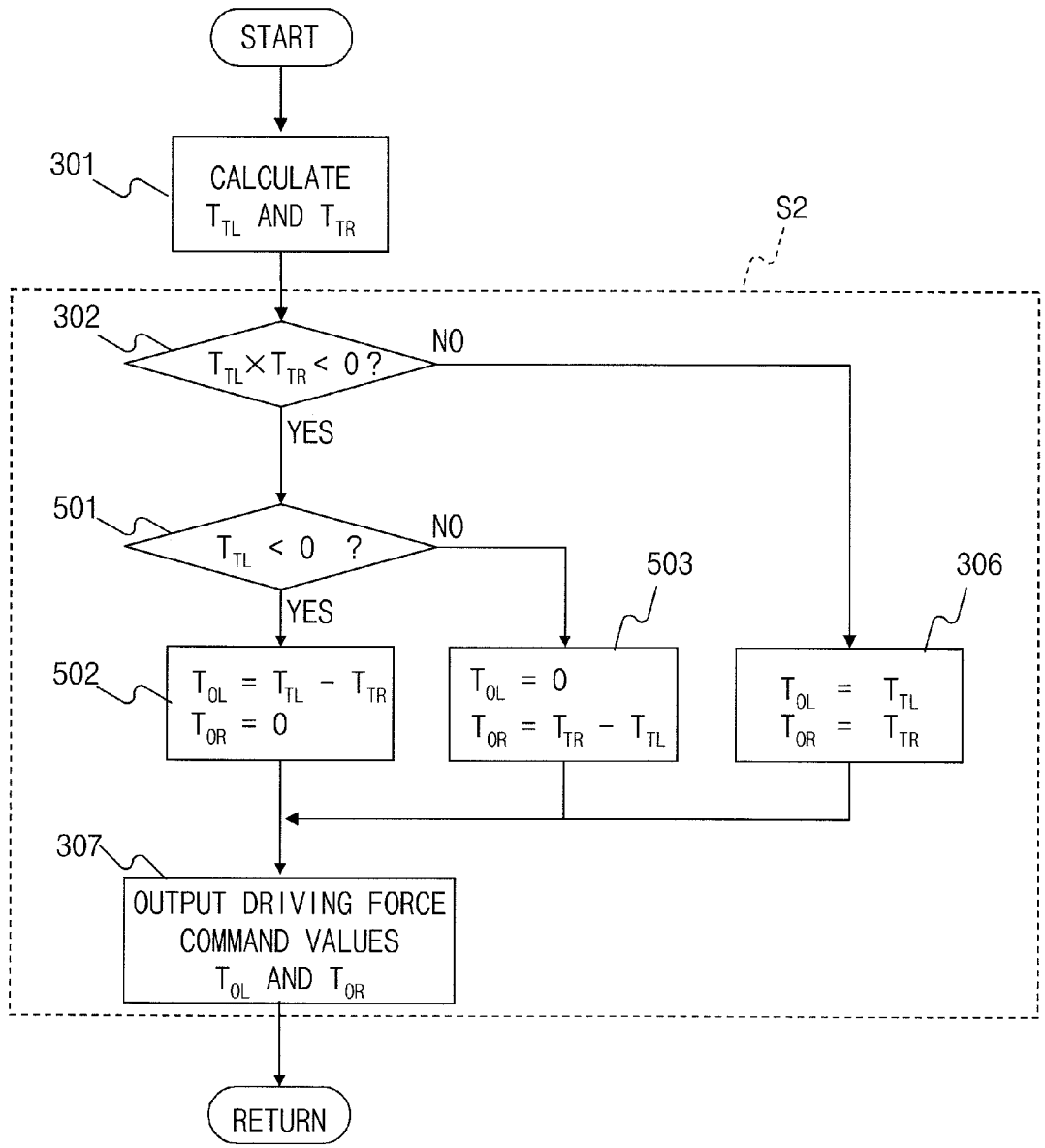
FIG. 5 is a flowchart illustrating processing steps performed by the driving force control device 10 of the electric vehicle according to a second embodiment of the present invention.

A second embodiment of the present invention will now be described. The second embodiment differs from the first embodiment in the process performed by the driving force control device 10. However, the first and second embodiments have the same hardware configuration. FIG. 5 is a flowchart illustrating processing steps performed by the driving force control device 10 of the electric vehicle according to the second embodiment of the present invention.

As shown in FIG. 5, the flowchart illustrating a control process according to the present embodiment differs from the flowchart of FIG. 3. More specifically, if the determination result obtained in step 302 indicates that a motor engaged in power running and a motor engaged in regeneration coexist, step 501 is performed to determine which of the two motors 106c, 106d driving the left- and right-side wheels 107c, 107d is performing a regeneration operation. The driving force command value for the motor engaged in regeneration is then calculated by subtracting a value corresponding to the target driving force for the motor engaged in power running from the target driving force for the motor engaged in regeneration. Further, the target driving force for the motor engaged in power running is changed to zero to calculate the driving force command value for the motor engaged in power running (step 502 or 503). A process performed in steps 302 to 307, which are enclosed by the broken line in FIG. 5, may be referred to as S2.

Even when the driving force command value is calculated in the above manner, the requested amount of yaw moment can be generated in accordance with the torque difference between the left- and right-side wheels 107c, 107d, as is the case with the first embodiment. Therefore, a target vehicle motion can be maximally realized while appropriately maintaining the drive status of each motor. When, in particular, the driving force command value is calculated in the above manner, the driving force command value for the motor engaged in power running is always zero in a situation where a motor engaged in power running and a motor engaged in regeneration coexist. This provides an advantage in that inadvertent vehicle acceleration can be prevented. In other words, the driving force can be redistributed to avoid the coexistence of motors engaged in power running and in regeneration while decelerating the entire vehicle and maintaining the driving force difference.

A third embodiment of the present invention will now be described. The third embodiment is characterized in that either the control process S1 according to the first embodiment or the control process S2 according to the second embodiment is selectively performed depending on whether an acceleration request or a deceleration request is represented by the target driving force for the entire vehicle, which is based on a request designated, for instance, by an operation performed by the operator. It should be noted that the third embodiment has the same electric vehicle hardware configuration as the foregoing embodiments.

Figure 6:
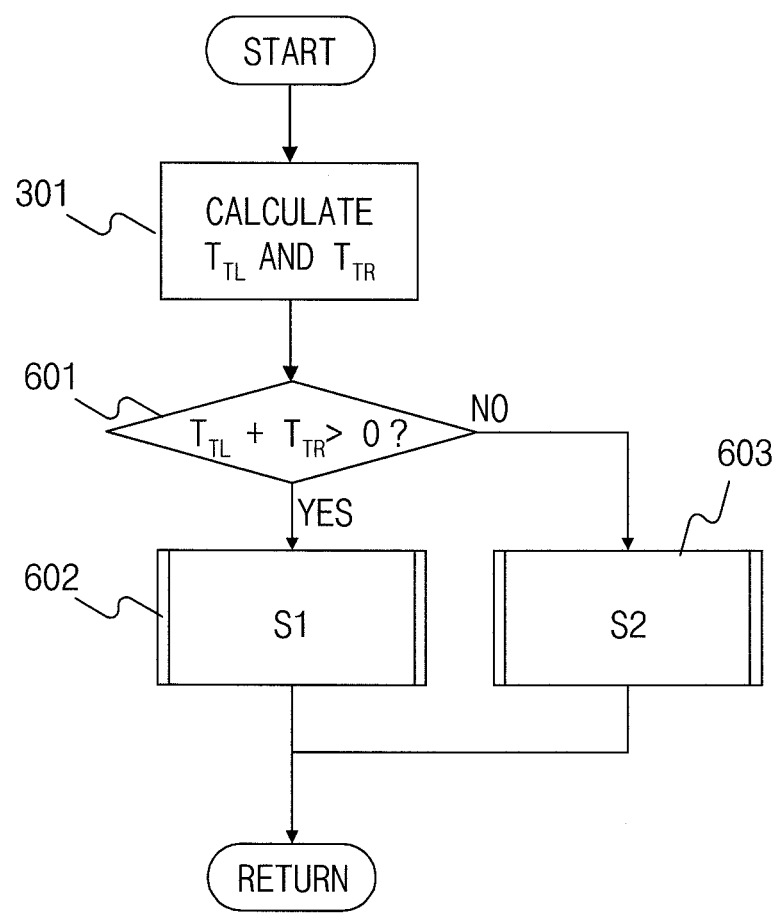
FIG. 6 is a flowchart illustrating processing steps performed by the driving force control device 10 of the electric vehicle according to a third embodiment of the present invention.

FIG. 6 is a flowchart illustrating processing steps performed by the driving force control device 10 of the electric vehicle according to the third embodiment of the present invention. As shown in FIG. 6, the determination section 12 of the driving force control device 10 calculates the sum of the target driving forces $T_{TL}$, $T_{TR}$ for the two motors, which are calculated in step 301, and determines whether the target driving force for the entire vehicle represents an acceleration request or a deceleration request by determining whether the sign of the sum of the two target driving forces $T_{TL}$, $T_{TR}$ is positive or negative (step 601). If the determination result obtained in step 601 indicates that the sum of the target driving forces is positive (indicative of an acceleration request), the driving force control device 10 performs the process S1 (step 602). If, on the other hand, the determination result obtained in step 601 indicates that the sum is negative (indicative of a deceleration request), the driving force control device 10 performs the process S2 (step 603).

When the driving forces of the motors 106c, 106d are controlled as described above, the process S1 is performed as far as an acceleration request is generated. Therefore, the driving forces can be redistributed while maintaining the entire vehicle in an acceleration state. If, on the other hand, a deceleration request is generated, the process S2 is performed. Therefore, the driving forces can be redistributed while maintaining the entire vehicle in a deceleration state. Consequently, the present embodiment can provide control in such a manner as to further reflect the operator's intention regarding acceleration/deceleration.

Figure 7:
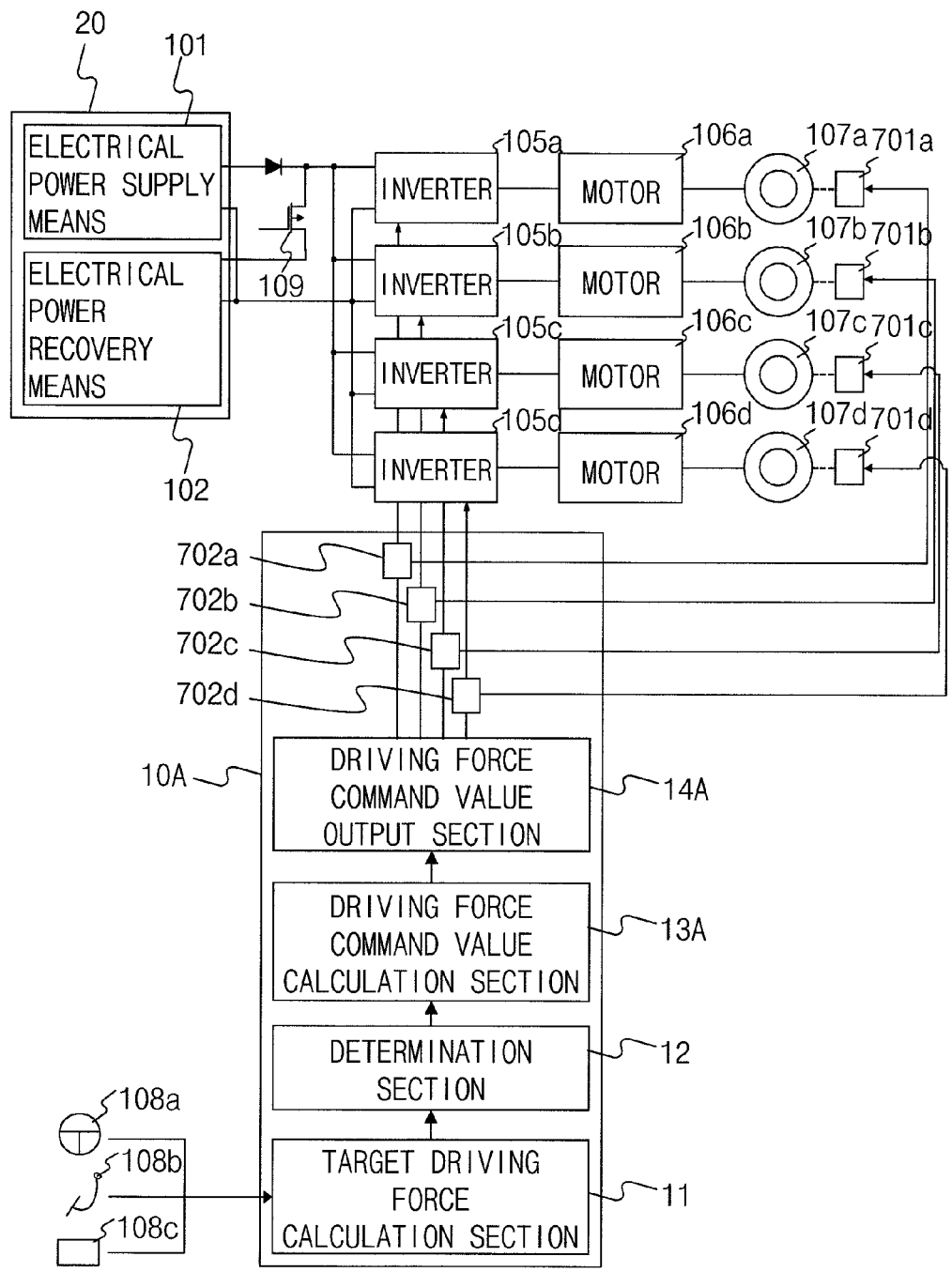
FIG. 7 is a diagram illustrating the overall configuration of the electric vehicle according to a fourth embodiment of the present invention.

A fourth embodiment of the present invention will now be described. FIG. 7 is a diagram illustrating the overall configuration of the electric vehicle according to the fourth embodiment of the present invention. The electric vehicle shown in FIG. 7 includes a plurality of braking devices 701a to 701d, a driving force control device 10A, a plurality of wheels 107a to 107d, a plurality of motors 106a to 106d, a plurality of inverters 105a to 105d, a battery 20, and a chopper 109.

The braking devices 701a to 701d independently apply a braking torque to the wheels 107a to 107d in accordance with a braking force command value output from the driving force control device 10A. The braking devices 701a to 701d may, for example, provide friction-based braking by pressing a friction material against a rotating member, which rotates together with the wheels 107a to 107d. In the foregoing embodiments, all the driving force command values are output to the inverters 105a to 105d. However, the braking devices 701a to 701d input a negative driving force command value or a driving force command value corresponding to the regenerative torque deficiency of the motors 106a to 106d from command value output sections 702a to 702d as a driving force command value, and generate a braking torque corresponding to the driving force command value.

The driving force control device 10A includes a driving force command value calculation section 13A, a command value output section 14A, and command value output sections 702a to 702d.

If the determination section 12 determines that some of the motors 106a to 106d are engaged in power running while the others are engaged in regeneration, the driving force command value calculation section (driving force command value calculation means) 13A calculates the driving force command values for the motors 106a to 106d engaged in power running in accordance with their target driving forces, and calculates the driving force command values for the motors 106a to 106d engaged in regeneration after changing their target driving forces to zero. Further, in order to let the associated braking devices 701a to 701d generate braking torques corresponding to the target driving forces for the motors engaged in regeneration, the driving force command value calculation section 13A calculates the driving force command values for the associated braking devices 701a to 701d. Although the two types of driving force command values are calculated, the driving force command values for the motors 106a to 106d are output to the command value output section 14A, and the driving force command values for the braking devices 701a to 701d are output to the command value output sections 702a to 702d associated with the braking devices 701a to 701d through the command value output section 14A.

The command value output section 14A is connected to the inverters 105a to 105d. The command value output section 14A receives the driving force command values, which are input from the driving force command value calculation section 13A, and outputs the driving force command values to the associated inverters 105a to 105d. The command value output sections 702a to 702d are connected to the associated braking devices 701a to 701d, respectively. The command value output sections 702a to 702d receive the driving force command values, which are input from the driving force command value calculation section 13A, and outputs the driving force command values to the associated braking devices 701a to 701d. In other words, in the present embodiment, the command value output section 14A and the command value output sections 702a to 702d function as command value output means.

If, in the electric vehicle configured as described above, the determination section 12 determines that the motors 106a to 106d engaged in power running and in regeneration coexist, a driving force command value corresponding to the target driving force calculated by the target driving force calculation section 11 is output to the inverters 105 associated with the motors 106 engaged in power running so that the motors 106 are driven in accordance with the driving force command value. Meanwhile, the command value output sections 702 output a driving force command value for generating a braking torque corresponding to the target driving force calculated by the target driving force calculation section 11 to the braking devices 701 associated with the motors 106 to be engaged with regeneration. Therefore, the braking devices 701 generate a braking torque in place of the motors 106.

Now, all the motors 106a to 106d perform a power running operation. As a result, the drive voltage required for motor power running does not greatly differ from the regenerative voltage generated during motor regeneration. This makes it possible to avoid a situation where motor efficiency significantly decreases to result in the failure to generate required torque and provide vehicle motion control based on a desired torque difference. In other words, a power running state and a regeneration state can be clearly differentiated from each other to provide reliable vehicle motion control irrespective of motor characteristics and motor operating status. In the present embodiment, in particular, the braking devices 701a to 701d generate a deceleration torque equivalent to the driving force command value for the regeneration side. This makes it possible to prevent the entire vehicle from being accelerated when the operator makes a request for deceleration. Hence, the behavior of the vehicle does not disagree with an operation performed by the operator. This decreases the possibility of the operator feeling uncomfortable with the behavior of the vehicle.

Figure 8:
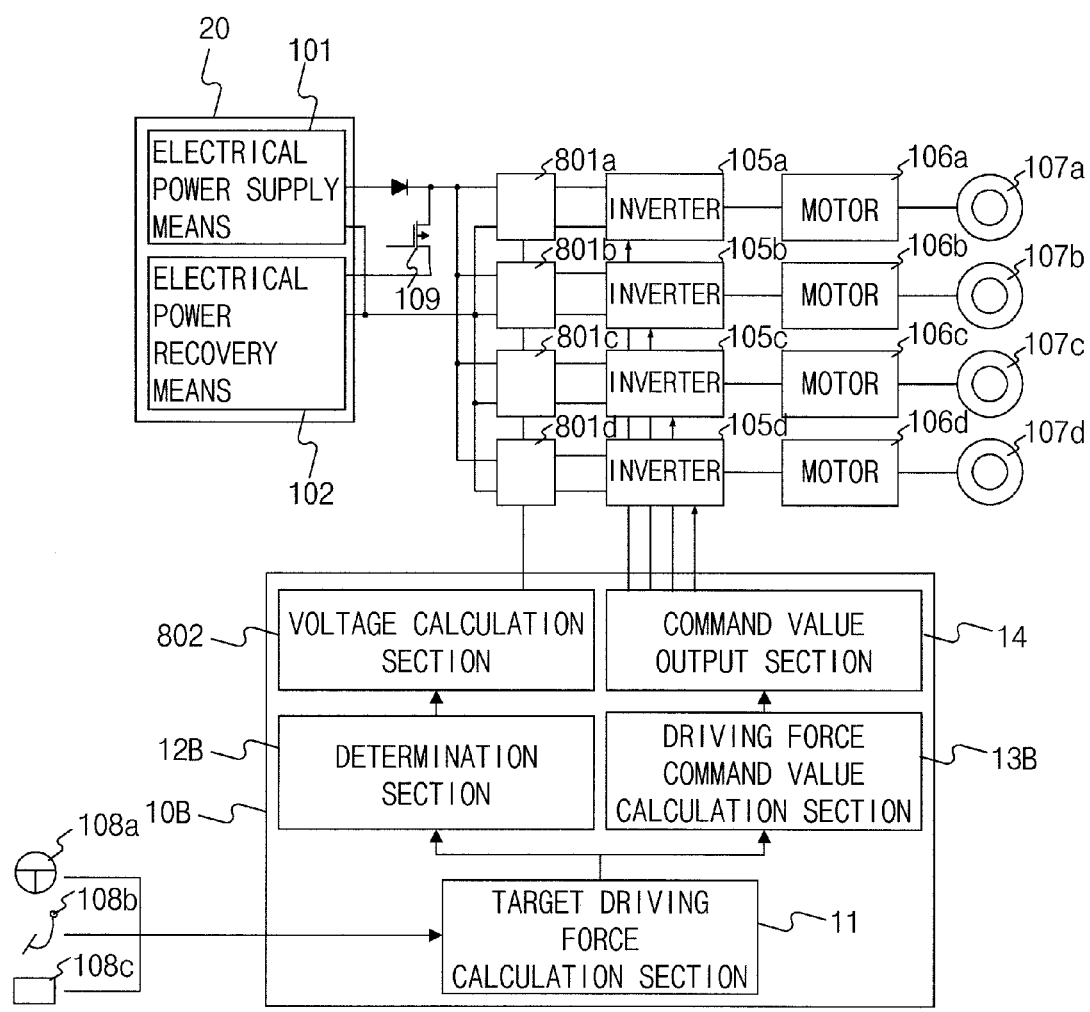
FIG. 8 is a diagram illustrating the overall configuration of the electric vehicle according to a fifth embodiment of the present invention.

A fifth embodiment of the present invention will now be described. FIG. 8 is a diagram illustrating the overall configuration of the electric vehicle according to the fifth embodiment of the present invention. The electric vehicle shown in FIG. 8 includes a plurality of voltage regulators 801a to 801d, a driving force control device 10B, a plurality of wheels 107a to 107d, a plurality of motors 106a to 106d, a plurality of inverters 105a to 105d, a battery 20, and a chopper 109.

The voltage regulators 801a to 801d are respectively disposed on power supply lines connecting the inverters 105a to 105d to the battery 20, and used to generate a voltage that is calculated by a voltage calculation section 802 in the driving force control device 10B.

The driving force control device 10B includes a target driving force calculation section 11, a driving force command value calculation section 13B, a command value output section 14, a determination section 12B, and the voltage calculation section 802.

The driving force command value calculation section 13B calculates an actual driving force command value for each of the motors 106a to 106d in accordance with the target driving force for each of the motors 106a to 106d, which is calculated by the target driving force calculation section 11. And the driving force command value calculation section 13B is connected to the target driving force calculation section 11 and to the command value output section 14. The determination section 12B determines whether the motors 106a to 106d engaged in power running and in regeneration coexist when the motors 106a to 106d are driven by the target driving force calculated by the target driving force calculation section 11. And the determination section 12B is connected to the target driving force calculation section 11 and to the voltage calculation section 802. A determination result produced by the determination section 12B is output to the voltage calculation section 802.

When the determination section 12 determines that the motors 106a to 106d engaged in power running and in regeneration coexist, the voltage calculation section (voltage calculation means) 802 detects the difference between a voltage supplied to the motors engaged in power running and a voltage generated by the motors engaged in regeneration, and calculates the voltages required for compensating for the voltage difference. The voltage calculation section 802 is connected to the determination section 12B and to the voltage regulators 801a to 801d. The voltages calculated by the voltage calculation section 802 are output to the associated voltage regulators 801a to 801d.

If, in the electric vehicle configured as described above, the determination section 12B determines that the motors 106a to 106d engaged in power running and in regeneration coexist, the voltage calculation section 802 calculates the voltages required for compensating for the difference between the voltage supplied to the motors engaged in power running and the voltage generated by the motors engaged in regeneration, and outputs the calculated voltage values to the associated voltage regulators 801a to 801d. Upon receipt of the voltage values calculated by the voltage calculation section 802, the voltage regulators 801a to 801d generate the corresponding voltages to compensate for the voltage difference between the motors engaged in power running and the motors engaged in regeneration.

As described above, even when the motors 106a to 106d engaged in power running and in regeneration coexist, the present embodiment makes it possible to compensate for the voltage difference between the motors engaged in power running and the motors engaged in regeneration. Therefore, the drive voltage required for motor power running does not greatly differ from the regenerative voltage generated during motor regeneration. This makes it possible to avoid a situation where motor efficiency significantly decreases to result in the failure to generate required torque and provide vehicle motion control based on a desired torque difference. Consequently, the present embodiment can also provide reliable vehicle motion control irrespective of motor characteristics and motor operating status.

In the description of the foregoing embodiments, the type of the electric vehicle is not specifically limited. However, yaw moment control for skid correction is important for vehicles having a great overall weight and a relatively high center of gravity because their motion is likely to become unstable. Hence, the driving force control devices 10, 10A, 10B described in connection with the foregoing embodiments produce more remarkable effects than when they are applied to passenger cars. One example of a vehicle having a great overall weight and a relatively high center of gravity would be a dump truck equipped with a vessel.

Figure 9:
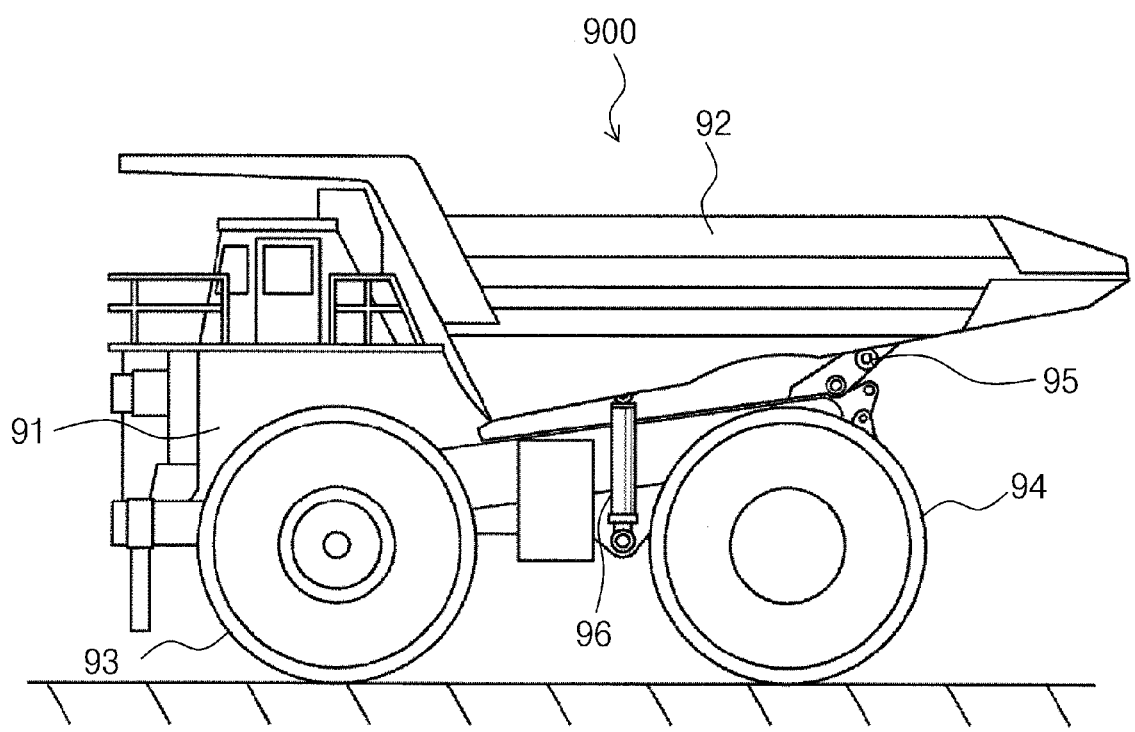
FIG. 9 is a diagram illustrating the overall configuration of a dump truck according to an embodiment of the present invention.

FIG. 9 is a diagram illustrating the overall configuration of a dump truck according to an embodiment of the present invention. The dump truck 900 shown in FIG. 9 mainly includes a vehicle body 91 formed by a sturdy frame structure, a vessel (load-carrying platform) 92 tiltably mounted on the vehicle body 91, and front wheels 93 and rear wheels 94 mounted on the vehicle body 91. The vessel 92 is a container in which crushed stone and other loads are to be placed, and tiltably coupled to the vehicle body 91 through a pin coupler 95 or the like. Two tilting cylinders 96 are disposed under the vessel 92 and spaced apart a predetermined distance in the direction of vehicle width. When hydraulic fluid is supplied to or discharged from the tilting cylinders 96, the tilting cylinders 96 extend or contract to tilt the vessel 92.

While loads are placed in the vessel 92 of the dump truck shown in FIG. 9, the total weight may be several times the vehicle weight, raising the vehicle's center of gravity. As such being the case, the driving force control devices 10, 10A, 10B described in connection with the foregoing embodiments can produce remarkable effects.

While particular embodiments of the present invention have been described, it should be understood that the present invention is not limited to detailed configurations of the above-described embodiments. It will be apparent to persons skilled in the art that design changes and various other modifications can be made without departing from the spirit and scope of the present invention.

DESCRIPTION OF REFERENCE NUMERALS

10 . . . Driving force control device
11 . . . Target driving force calculation section
12 . . . Determination section
13 . . . Driving force command value calculation section
14 . . . Command value output section
20 . . . Battery 105 . . . Inverter
106 . . . Motor
107 . . . Wheel
108 . . . Various sensors
701 . . . Braking device
702 . . . Command value output section
801 . . . Voltage regulator
802 . . . Voltage calculation section
TTL, TTR . . . Target driving force
TOR, TOL . . . Driving force command value

The invention claimed is:

1. A driving force control processor for an electric vehicle having a plurality of motors, which independently drive a plurality of wheels, and a plurality of inverters, which control a drive current for each of the motors in accordance with a driving force command value, the driving force control processor comprising:

target driving force calculation means configured to calculate and output a target driving force for each of the motors in accordance with a vehicle operation performed by an operator of the vehicle or with the running status of the vehicle;

determination means configured to receive the target driving force from the target driving force calculation means, and to determine and output whether the motors engaged in power running and in regeneration would coexist if each of the motors is driven by the target driving force;

driving force command value calculation means configured to receive the output from the determination means, and if the determination means determines that the motors engaged in power running and in regeneration coexist, to adjust the distribution of driving force for each of the motors in accordance with the target driving force for each of the motors so that all of the motors are engaged in either power running or regeneration, and to calculate and output an actual driving force command value for each of the motors; and command value output means configured to receive the actual driving force command value for each of the motors and to output the actual driving force command value to each of the inverters for the purpose of operating each of the motors, wherein the motors drive the left- and right-side wheels of the electric vehicle; and wherein if the determination means determines that one of the two motors driving the left- and right-side wheels is engaged in power running whereas the other motor is engaged in regeneration, the driving force command value calculation means is configured to compare the absolute values of target driving forces for the two motors, invert the sign of the target driving force for the motor having the smaller absolute value, add the resulting target driving force to the target driving force for the other motor to calculate the actual driving force command value for the other motor, and calculate the actual driving force command value for the motor having the smaller absolute value by changing the target driving force for the motor having the smaller absolute value to zero.

2. A driving force control processor for an electric vehicle having a plurality of motors, which independently drive a plurality of wheels, and a plurality of inverters, which control a drive current for each of the motors in accordance with a driving force command value, the driving force control processor comprising:

target driving force calculation means configured to calculate and output a target driving force for each of the motors in accordance with a vehicle operation performed by an operator of the vehicle or with the running status of the vehicle;

determination means configured to receive the target driving force from the target driving force calculation means, and to determine and output whether the motors engaged in power running and in regeneration would coexist if each of the motors is driven by the target driving force;

driving force command value calculation means configured to receive the output from the determination means, and if the determination means determines that the motors engaged in power running and in regeneration coexist, to adjust the distribution of driving force for each of the motors in accordance with the target driving force for each of the motors so that all the motors are engaged in either power running or regeneration, and to calculate an actual driving force command value for each of the motors; and command value output means configured to receive the actual driving force command value for each of the motors and to output the actual driving force command value to each of the inverters for the purpose of operating each of the motors, wherein the motors drive the left- and right-side wheels of the electric vehicle; and wherein, if the determination means determines that one of the two motors driving the left- and right-side wheels is engaged in power running whereas the other motor is engaged in regeneration, the driving force command value calculation means is configured to calculate the actual driving force command value for the motor engaged in regeneration by subtracting a value equivalent to the target driving force for the motor engaged in power running from the target driving force for the motor engaged in regeneration, and to calculate the actual driving force command value for the motor engaged in power running by changing the target driving force for the motor engaged in power running to zero.

3. The driving force control processor according to claim 1, wherein, when the determination means determines that one of the two motors driving the left- and right-side wheels is engaged in power running whereas the other motor is engaged in regeneration, the driving force command value calculation means is configured to determine the sum of the target driving forces for the two motors, and a) if the sign of the sum is positive, then the driving force command value calculation means is configured to compare the absolute values of the target driving forces for the two motors, to invert the sign of the target driving force for the motor having the smaller absolute value, to add the resulting target driving force to the target driving force for the other motor to calculate the actual driving force command value for the other motor, and to calculate the actual driving force command value for the motor having the smaller absolute value by changing the target driving force for the motor having the smaller absolute value to zero, and b) if the sign of the sum is negative, then the driving force command value calculation means is configured to calculate the actual driving force command value for the motor engaged in regeneration by subtracting a value equivalent to the target driving force for the motor engaged in power running from the target driving force for the motor engaged in regeneration, and to calculate the actual driving force command value for the motor engaged in power running by changing the target driving force for the motor engaged in power running to zero.

4. A driving force control processor for an electric vehicle having a plurality of motors, which independently drive a plurality of wheels, a plurality of inverters, which control a drive current for each of the motors in accordance with a driving force command value, and a plurality of braking devices, which independently apply a braking torque to each of the wheels, the driving force control processor comprising:

target driving force calculation means configured to calculate and output a target driving force for each of the motors in accordance with a vehicle operation performed by an occupant of the vehicle or with the running status of the vehicle;

determination means configured to receive the target driving force from the target driving force calculation means, and to determine whether the motors engaged in power running and in regeneration would coexist if each of the motors is driven by the target driving force;

driving force command value calculation means configured to receive the output from the determination means, and if the determination means determines that the motors engaged in power running and in regeneration coexist, to calculate the actual driving force command value for a motor engaged in power running in accordance with the target driving force for the motor engaged in power running, to calculate the actual driving force command value for a motor engaged in regeneration by changing the target driving force for the motor engaged in regeneration to zero, to calculate actual driving force command values for the braking devices in order to permit the braking devices to generate a braking torque equivalent to the target driving force for the motor engaged in regeneration, and to output the actual driving force command values; and command value output means configured to receive the actual driving force command values for the purpose of operating each of the motors and outputs the actual driving force command value to each of the inverters and to output the actual driving force command value to each of the braking devices.

* * * * *